Jan. 23, 1940.　　　　　L. GREER　　　　　2,187,781
VEHICLE DRIVE SYSTEM
Filed Aug. 30, 1939
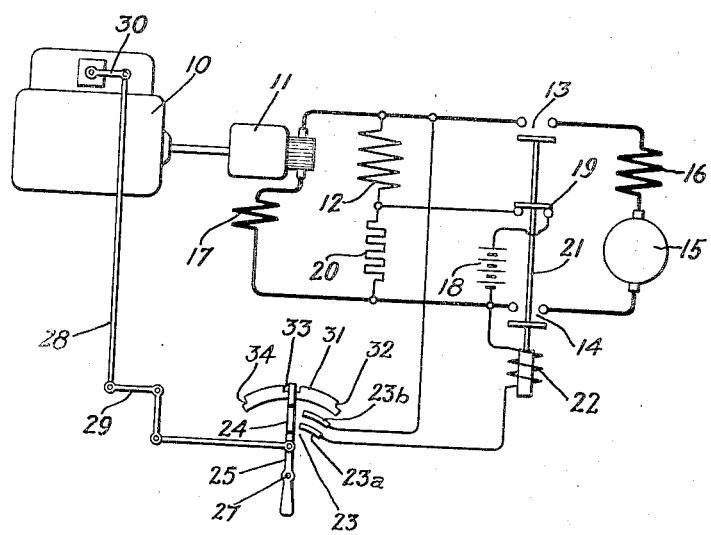
Inventor:
Lanier Greer,
by Harry E. Dunham
His Attorney.

Patented Jan. 23, 1940

2,187,781

UNITED STATES PATENT OFFICE 2,187,781

VEHICLE DRIVE SYSTEM

Lanier Greer, Lawrence Park, Pa., assignor to General Electric Company, a corporation of New York Application August 30, 1939, Serial No. 292,650

4 Claims. (Cl. 290—17)

My invention relates to vehicle drive systems, more particularly to vehicle drive systems utilizing a prime mover driven generator, such as Diesel electric locomotives, and has for its object a simple and reliable system for controlling the generator field teasing circuit.

In carrying out my invention, I provide a suitable auxiliary source of direct current, such as a storage battery, for exciting the generator field winding to give quick generator response and control the connection of this battery to the field winding by a switch which is connected to main switching means between the generator and the driving motor or motors so as to close when the motor is disconnected from the generator. I also provide a control device for the prime mover which device also controls the switching means connecting the motor to the generator in such manner that over a predetermined idling speed range the motor is deenergized and the auxiliary source connected to supply current to the generator field winding.

For a more complete understanding of my invention, reference should be had to the accompanying drawing, the single figure of which is a diagrammatic representation of a vehicle control system embodying my invention.

Referring to the drawing, I have shown my invention in one form as applied to a Diesel electric driving system such as used on industrial locomotives. A Diesel engine prime mover 10 drives a direct current generator 11 having a shunt field winding 12 for supplying energy through the disconnecting switches 13 and 14 to a direct current motor 15 provided with a series field winding 16. It will be understood that this motor is suitably connected to drive the driving wheels (not shown) of the locomotive. A suitable series field winding 17 is also provided for the generator.

For the purpose of supplying additional excitation current to the field winding 12, a suitable auxiliary source of direct current supply, shown as a storage battery 18 is provided. This storage battery may be connected by a battery switch 19 across a resistance 20 in series with the field winding 12. The switch 19 is preferably suitably interlocked with the switches 13 and 14 and, as shown, it is mounted on a common insulated operating rod 21 for the switches 13 and 14 so as to be closed when the switches 13 and 14 are open. The normally open switches 13 and 14 are closed and the switch 19 opened by an operating coil 22 which may be connected for energization across the generator 11 by a control switch 23.

The control switch 23 comprises two elongated stationary contacts 23a and 23b and a movable bridging contact 24 carried by a handle 25. The contact 24 slidably engages and electrically connects together the two contacts 23a and 23b when the handle is turned in a clockwise direction about its pivot 27 from the mid-position shown. This handle 25 is primarily a speed control handle for the Diesel engine 10. It is connected through a suitable linkage 28 containing a bell crank lever 29 to the throttle or fuel pump 30 of the engine so that clockwise movement of the handle about its pivot 27 accelerates the engine.

The handle 25 is provided with a suitable positioning segment 31 having a high speed notch 32 at its right-hand end, an idling notch 33 at its center and low speed idling notch 34 at its left-hand end. It will be understood that the handle can be positioned in any desired position between these three positions. When the handle is in the positions 33 and 34 or in any position between them, i. e., in its idling range, the switch 23 is open as shown, but when the handle is moved from the position 33 toward the position 32, the contact 24 immediately engages the contacts 23a and 23b, the switch 23 being thereby closed and remaining closed during this vehicle driving range of movement of the handle to and including the position 32.

In the operation of the system, when the engine is idling with the handle 25 in an idling position 33 or 34 or in any position between them, the switch 23 is open and, therefore, the switches 13 and 14 are open and the switch 19 is closed to connect the battery in a teasing circuit with the shunt field winding 12. Consequently, under these conditions, the generator is excited to deliver a predetermined considerable amount of voltage depending upon its speed and in condition to immediately supply current to the motor when the handle 25 is moved to accelerate the engine and close the switches 13 and 14. It will be understood that the resistance 20 is supplied with some current from the battery independently of the field winding, but this resistance is of sufficient magnitude to hold this current to a predetermined permissible low value.

Preferably, the handle 25 is turned to the position 33 for short idling periods while, for long idling periods it may be moved back to the low speed idling position 34. The speeds in these positions 34, 33 and 32 may be respectively 450 R. P. M., 1,000 R. P. M. and 1,800 R. P. M. The high idling speed position 33 is so selected that no undesirable performance of the vehicle results when the motor is connected to the generator with the engine running at that speed. It will be understood that a reversing switch (not shown) may be provided for reversing the connections between the motor and generator for reverse rotation.

While I have disclosed my invention as applied to a single generator and a single motor, it will be understood that the invention is equally applicable to a multiplicity of motors energized from a single generator, and to several generator and motor combinations on a single vehicle.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. A vehicle drive system comprising a generator provided with a field winding, prime mover driving means for said generator, a driving motor for the vehicle, main switching means controlling the connection of said motor to said generator, an auxiliary source of direct current, auxiliary switching means for connecting said auxiliary source in an electric circuit with said field winding, accelerating means for said prime mover, and operating connections between said accelerating means and said switching means for opening said main switching means and closing said auxiliary switching means when said prime mover is running at one speed and for closing said main switching means and opening said auxiliary switching means when said prime mover is running at a higher speed.

2. A vehicle drive system comprising a generator provided with a field winding, prime mover driving means for said generator, a driving motor for the vehicle, main switching means controlling the connection of said motor to said generator, an auxiliary source of direct current, auxiliary switching means for connecting said auxiliary source in an electric circuit with said field winding, accelerating means for said prime mover, a control device connected to operate said acceleration means, said main switching means and said auxiliary switching means so as to close said main switching means and open said auxiliary switching means when said control device is in one position and open said main switching means and close said auxiliary switching means to connect said auxiliary source to said field winding when said control device is in another position.

3. A vehicle drive system comprising a generator provided with a field winding, prime mover driving means for said generator, a driving motor for the vehicle, main switching means for controlling the connection of said motor to said generator, an auxiliary source of direct current, auxiliary switching means for connecting said auxiliary source in an electric circuit with said field winding, accelerating means for said prime mover, a control device connected to operate said acceleration means, a coil for operating said main switching means to its closed circuit position, and control switching means operated by said control device when in a predetermined position to thereby close said main switching means and open said auxiliary switching means and operated by said control device when said device is in another predetermined position to open said main switching means and close said auxiliary switching means to connect said auxiliary source to said field winding.

4. A vehicle drive system comprising a generator provided with a shunt field winding, prime mover driving means for said generator, a driving motor for the vehicle, main switching means for controlling the connection of said motor to said generator, a storage battery, battery switching means operatively connected to said main switching means for connecting said battery in an electric circuit with said shunt field winding when said main switching means is open, accelerating means for said prime mover, a control device connected to operate said accelerating means and movable over a predetermined range of movement for operation of said prime mover at an idling speed and over another predetermined range of movement for vehicle driving operation of said prime mover, a coil for operating said main switching means to its closed circuit position when said coil is energized, and control switching means for said coil closed by said control device when said control device is in said driving range of movement to thereby close said main switching means and opened by said control device when said control device is in said idling range of movement to open said main switching means and operate said battery switching means to connect said battery to said shunt field winding.

LANIER GREER.